United States Patent [19]

Esser

[11] 4,302,047
[45] Nov. 24, 1981

[54] HINGE MOUNT FOR SEATS HAVING ADJUSTABLE BACKREST

[75] Inventor: Hermann Esser, Würselen, Fed. Rep. of Germany

[73] Assignee: Keiper Automobiltechnik GmbH & Co. K.G., Remscheid, Fed. Rep. of Germany

[21] Appl. No.: 93,712

[22] Filed: Nov. 13, 1979

[30] Foreign Application Priority Data

Nov. 15, 1978 [DE] Fed. Rep. of Germany ....... 2849542

[51] Int. Cl.³ ............................................. A47C 1/025
[52] U.S. Cl. ...................................... 297/362; 74/462
[58] Field of Search ........ 297/362, 354, 355, 366–369; 74/462, 460, 457

[56] References Cited

U.S. PATENT DOCUMENTS 4,149,431  4/1979  Rouverol ............................. 74/462

FOREIGN PATENT DOCUMENTS 2225757  12/1972  Fed. Rep. of Germany ...... 297/366
2446181   5/1976  Fed. Rep. of Germany ...... 297/366

*Primary Examiner*—William E. Lyddane
*Attorney, Agent, or Firm*—Michael J. Striker

[57] ABSTRACT

The hinged mount for motor vehicle seats includes a wobble gear adjuster having an outer gear integrally formed on a hinged mount secured to the seat proper and an inner gear integrally formed on a hinged mount secured to the reclinable backrest. The toothing of the outer gear has an outline composed of an alternating succession of concave and convex circular sections having substantially the same diameter of curvature. The outline of the toothing of the inner gear is formed by concave curves forming the root flanks of respective teeth and being equidistant from a cycloid generated by the convex tips of the teeth of the outer gear. The cycloid root flanks are confluent with rounded crown flanks which transit into concave tips of the inner teeth having a shorter addendum than that of the outer teeth, and coinciding with the crown circle of the inner gear.

3 Claims, 7 Drawing Figures

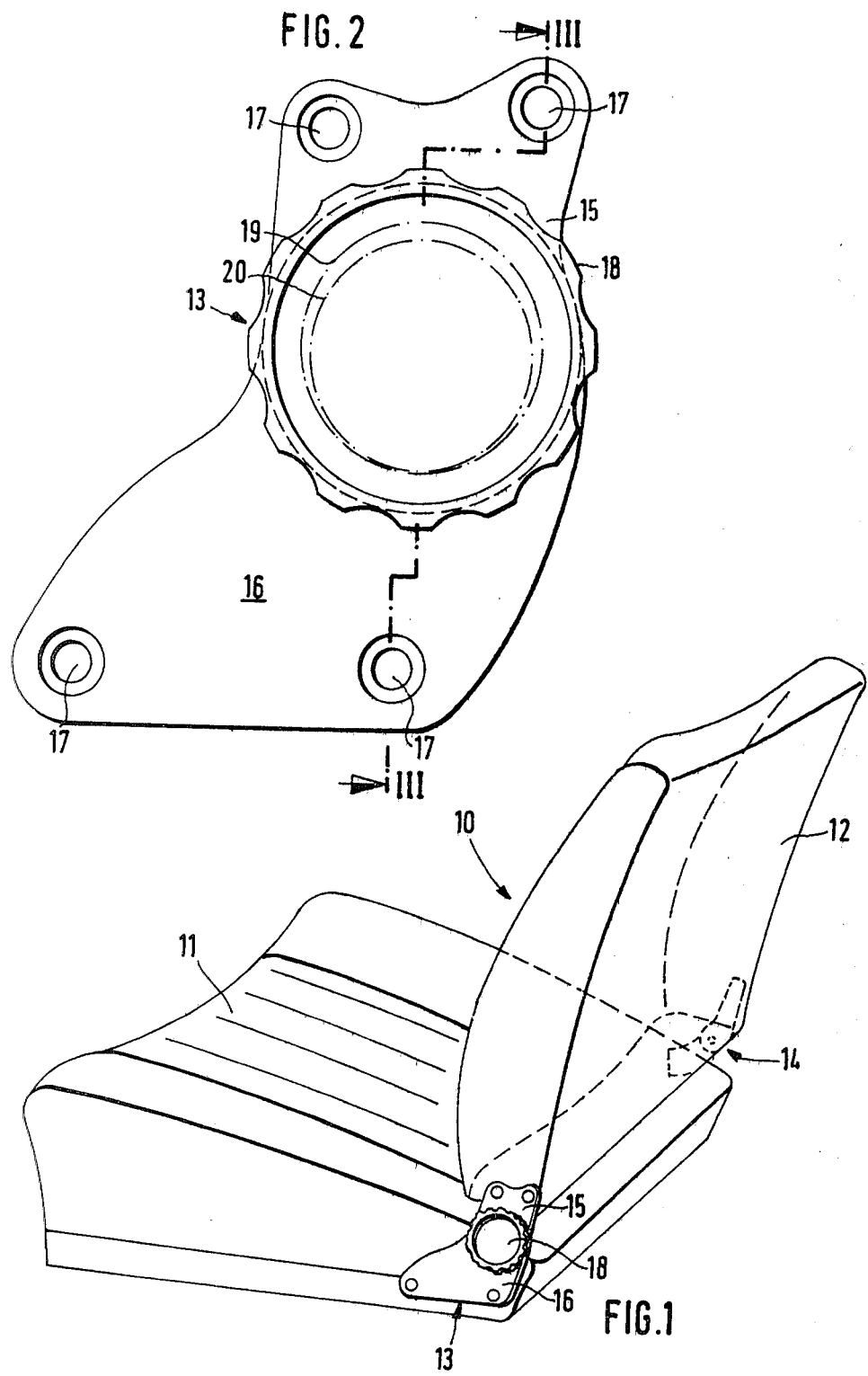

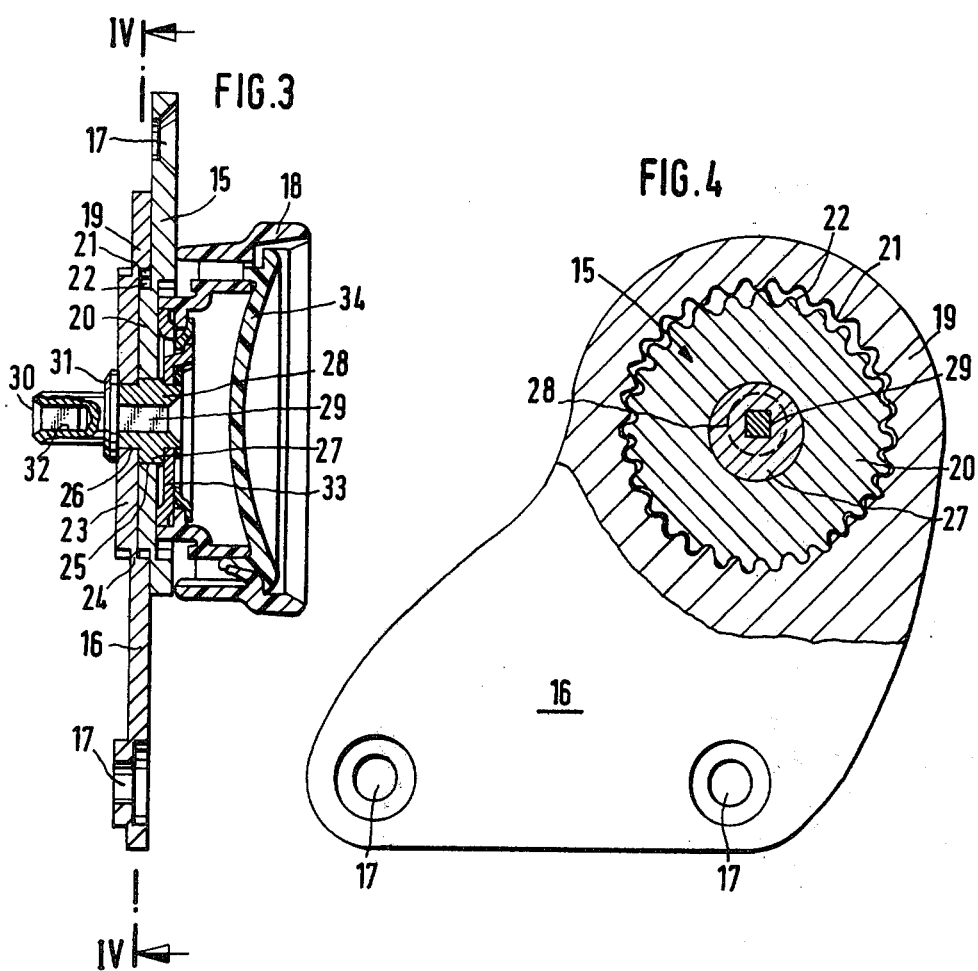

HINGE MOUNT FOR SEATS HAVING ADJUSTABLE BACKREST

BACKGROUND OF THE INVENTION

This invention relates generally to adjustable hinge mounts for the backrest of a seat, particularly a motor vehicle seat and more particularly it relates to an adjustable hinge mount of the type which includes a fixed mount part secured to the seat proper and a tiltable mount part secured to the backrest, a wobble gear assembly including an outer gear formed on one mount part and an inner gear formed on the other mount part, the number of teeth of the two gears differing at least about one tooth, a rotary axle having an eccentric portion supporting one of the gears and a concentric portion supporting the other gear to roll the outer gear in mesh with the inner gear whereby the profiles of teeth of the two gears form continuous curves.

In prior art hinge mounts of the aforedescribed type the teeth both of the outer gear and of the inner gear formed on respective hinged mounts are made by pressing or by fine stamping the toothed sections of the mount parts so that the teeth are integrally shaped on the latter. When stamping normal involute or cycloid tooth profiles, the edge life of tools is relatively short because of the fact that there are sharp transitions between the tooth flanks and the root circle or the crown circle, and also due to the relatively small radius of curvature of the cycloid teeth. For this reason, conventional teeth in adjustable hinged mounts have usually a trochoidal profile. While the trochoids in the range of the root flanks of the outer gear and in the range of the ground flanks of the inner gear are formed approximately by a circular section, the curved portions between respective circular sections have the outline resulting from the rolling of the toothed profile of the outer gear in mesh with the inner gear on the pitch or rolling circle. These curved sections however still have relatively strongly bent areas so that the advantage of stamping lightly bent curves can be achieved at conventional hinged mounts only partially.

SUMMARY OF THE INVENTION

It is therefore a general object of the present invention to overcome the aforementioned disadvantages.

More particularly, it is an object of the invention to provide an improved adjustable hinged mount of the afore-described type in which the wobble gears have such toothed profiles which can be easily manufactured by stamping.

Another object of this invention is to provide such an improved hinged mount which at a predetermined manufacturing accuracy has a minimal backlash while permitting the transmission of high rotary moments.

In keeping with these objects, and others which will become apparent hereafter, one feature of the invention resides, in a hinged mount of the above-described type, in the provision of teeth in one gear in which the outline of each tooth is formed of three tangentially congruent circular sections having approximately the same radius whereas the toothing of the other gear has an outline which in the spaces between adjoining teeth has the form of a circular section which is approximately equidistant from a cycloid and having a radius of curvature which corresponds approximately to that of the circular sections of the one gear, and the adjoining outlines of crown flanks which are shorter than the crown flanks of the one gear and transit into a tooth tip the outline of which substantially coincides with the crown circle, have a radius of curvature adjusted to the cycloid root line and the tooth tip section.

By virtue of the tangentially congruent convex and concave circular sections of approximately equal radius which form the outline of the teeth of one of the gears a condition is created at which even the smallest radius of curvature taking place in the toothed outline of the other gear has a maximum attainable value. The toothing having a profile according to this invention, namely a profile assembled of circular sections of a relatively large curvature is particularly advantageous inasmuch as in manufacturing such toothing by stamping the danger of breaking out edges of a stamping or a cutting die is substantially reduced and consequently the working life of such stamping and cutting tools is considerably increased.

In order to achieve the maximum value of curvature of the smallest circular sections in the outline of teeth of a gear which is in mesh with the teeth of the other gear having tangentially confluent circuit sections of approximately equal radii of curvature, the toothings of respective gears, according to another feature of this invention have an outline formed by generating circles situated at a distance from the pitch circles. It will be noted, however, that this distance between a generating circle and its pitch circle cannot exceed a predetermined value inasmuch as by enlarging this distance the transmission angle is correspondingly increased thus resulting in a disadvantage that at excessive transmission angles in the presence of a certain inaccuracy in the clearance between the two gears, the backlash of the flanks of the teeth is also increased. It is true that the reduction of the distance between the pitch circle and the rolling circle diminishes the transmission angle nonetheless it brings about also the diminishing of the radius of curvature of the minimum circular sections of the counter gear. That means that a compromise has to be found for the measure of the distance between the rolling circle and the generating circles.

According to still another feature of this invention an advantageous outline of each tooth on one gear is formed by three circular sections having approximately the same radius and this tooth shape represents the generating curve for the equidistant cycloid sections of the root flanks of the other gear. As mentioned above, this cycloidal root sections of the other gear are confluent with circular sections forming the crown flanks and having a smaller radius. These small crown sections transmit into the concave tooth tip lines coinciding with the crown circle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of a motor vehicle seat having an adjustable hinged mount arranged between the seat proper and the backrest;

FIG. 2 is an enlarged view of the hinged mount of FIG. 1;

FIG. 3 is a sectional side view of the hinged mount of FIG. 2 taken along the line III—III;

FIG. 4 is a partly cut away sectional front view of the wobble gear adjuster in the hinge mount of this invention, taken along the line IV—IV of FIG. 3;

DESCRIPTION OF THE PREFERRED EMBODIMENTS

Figure 6:
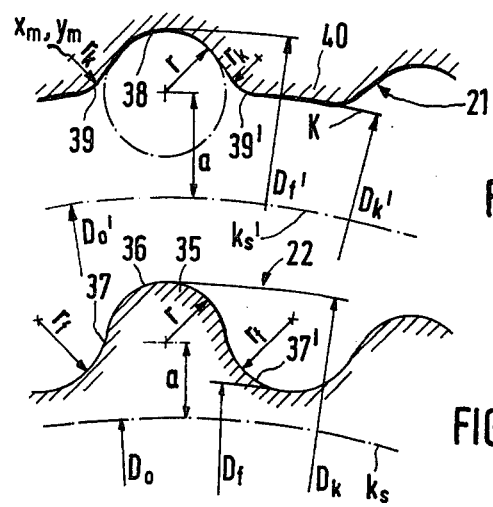
FIG. 6 shows on a scale corresponding to that of FIG. 5 the outline of teeth of the inner gear in the adjuster of FIG. 4.

Referring firstly to FIG. 1, there is shown a motor vehicle seat 10 having a seat proper 11 and a backrest 12 pivotably mounted on the latter. The seat part 11 and the backrest 12 are coupled to each other by a hinged mount 13 of this invention which is provided at least at one side of the seat whereas the opposite side can be provided with a simple hinged joint 14. Of course, it is also possible to replace the hinged joint 14 with an adjustable hinged mount which may be coupled to the opposite hinged mount 13 by means of a connecting shaft, for example. It will be noted that for the sake of simplicity all component parts of the seat which are not necessary for the understanding of this invention have been deleted in the drawing.

The hinged mount 13 is composed of a tiltable mount part 15 and a fixed mount part 16, both parts being adjustably coupled one to another in a manner which will be described below. The tiltable mount part 15 is secured to the backrest 12 and the fixed mount part 16 is mounted on the seat part 11. As seen from FIG. 2, each mount part has at its end side two mounting holes 17 for receiving suitable fastening means. This arrangement as well as the number and the structure of the mounting points as well as the kind of fastening means can be varied according to the particular requirements.

The adjustments of inclination of the tiltable mount part 15 and thus of the backrest 1 is controlled by an actuation member 18 in the form of a rotary knob connected to a wobble gear adjuster. As illustrated in FIGS. 3 and 4, one mount part is formed integrally with an inner gear 19 and the other mount part is formed with an outer gear 20. Both gears are in mesh in such a manner that a part of the teeth 21 of the inner gear 19 engages a corresponding part of the teeth of the outer gear 20. As seen most clearly from FIG. 4, in one angular position of the backrest the lower sections of gears 19 and 20 are in mesh whereas in another angular position of the backrest the area of engagement is correspondingly changed. The number of teeth of the inner gear 19 differs from the number of teeth of the outer gear 20 at least about one tooth whereby in the illustrated example the outer gear 20 has 29 teeth and the inner gear 19 has 30 teeth.

As mentioned above, the outer gear 20 is integrally formed on the tiltable mount part 15 whereas the inner gear 19 is integrally formed on the tiltable mount part 16. The free space between the teeth of the inner gear 19 is laterally bridged by a side plate 23 connected to the teeth of the inner gear by connecting bridges 24. The side plate 23 has also on its periphery an outer gear ring which has the same size as the inner tooth ring 21 of the gear 19 and has its teeth complementary to the interstices of the latter.

The manufacture of the inner gear 19 together with the side plate 23 is made in a single working cycle by a combined fine stamping and a flow or yield pressing process during which the inner gear ring 19 is created simultaneously with the side plate 23 by pressing and stamping a starting metal sheet material. The processing of the starting material takes place on a fine stamping press between a matrix and the upper die whereby the material is held on the matrix and the upper die is pressed into the latter. Both the upper die and the matrix are provided on its outer or inner periphery with edges corresponding to the profile of the inner gear 19. The outer gear 20 which is integrally formed in the tiltable mount part 15, is manufactured in the same manner as the inner gear 19. Also the required openings such as for example those necessary for supporting an eccentric axle which will be described below and also the mounting holes, can be produced in the same production step. As can be also seen from FIG. 3, the face of the outer gear 20 on the tiltable hinged mount part 15 corresponds approximately to the face of the inner gear 19 so that a direct contact of the facing surfaces of respective mount parts 15 and 16 is made possible.

The outer gear 20 as well as the side plate 23 of the inner gear 19 are provided respectively with control passages 25 and 26 which can be stamped out simultaneously with the manufacturing step of the outer gear 20 or of the inner gear 19. The central passage 25 of the outer gear 20 is supported for rotation on an eccentric 27 of an axle or shaft 28, as seen in FIG. 3. The inner gear 19 is supported on the adjoining concentric portion of the shaft 28. One end of the shaft 28 is firmly connected via a mounting disk 23 to the control knob 18. A mounting plate 33 is secured to the shaft 28 by riveting for example, and its outer side is firmly connected to a central disk 34 of the rotary knob 18. The other end of the shaft 28 remote from the knob 18, is flush with the outer surface of the side plate 23 of the inner gear 19. A noncircular bore 29 is formed in this other end and is coaxial with the concentric portion of the shaft 28. The bore 29 serves for receiving a matching end of a connecting shaft 30 which is secured to the shaft 29 for joint rotation and against axial displacement. The connecting shaft 30 has a flange 31 which abuts against the outer surface of the side plate 23, thus holding the eccentric shaft 29 in a fixed position relative to the wobbling gears. The projecting end of the connecting bolt or shaft 30 is provided with an axial blind bore 32 which partially has the shape of a hollow prism. The bore 32 may serve for accommodating a corresponding end of a connecting rod in the case when a second adjustable hinged mount is secured to the opposite side of the seat.

Figure 5:
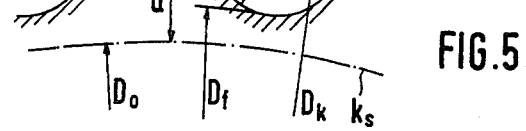
FIG. 5 shows on an enlarged scale a cut away portion of the outline of the teeth of the outer gear in the adjuster of FIG. 4.

The outline of each tooth 35 in the tooth ring 22 of the outer gear 20 is delimited by three confluent circular sections, namely by the convex tip section 36 having a radius r and of two tangentially confluent concave circular sections 37 and 37' forming the root flanks of each tooth and having a radius $r_f$ as illustrated in FIG. 5. Both radii r and $r_f$ are approximately of the same magnitude. These convex and concave circular sections transit one into the other in tangential direction without any break. The center of the crown circular section 36 having the radius r is offset from the circle of rolling ks about a certain predetermined distance a which should be selected such that the radius rk of the smallest circular section in the generated outline curve of the opposite gear does not fall below a predetermined limit value. The diameter $D_o$ of the circle $k_s$ of rolling of the outer gear 20 is computed according to the equation $$Do = Z \cdot m$$

where Z is the number of teeth of the outer gear and m is its module. The radius r of the tip portion of the generating tooth profile amounts to ¼ of the tooth pitch and is computed from the equation $$r = (Do/2 + a) \cdot \pi / 2 \cdot Z$$

where a denotes the distance between the circle of rolling $k_s$ and the center point of the circular section of the radius r forming the tip of a tooth. The diameter of the crown circle is computed from the equation $$Dk = Do + 2 \cdot (a + r)$$

whereby Dk denotes the diameter of the crown circle.

In order to meet the requirements of the stamping technology the radius $r_f$ of the circular sections forming the root flanks of the teeth of the outer gear should be selected as large as possible nonetheless to insure correct engagement of one gear with the opposite gear, the radius $r_f$ should not exceed substantially 1.1 times the module. Accordingly, the following equation is valid for the computation of the diameter of the root circle:

$$Df = 2 \cdot [(Do/2 + a) \cdot \cos(180°/Z) + \sqrt{(r + rf)^2 - (Do/2 + a)^2 \cdot \sin^2(180°/Z)} - r]$$

where Df is the diameter of the root circle of the outer gear.

The toothed profile of the tooth ring 21 of the inner gear 19 corresponds to a curve equidistant from a cycloid, that means to a contour produced by a generating point rolling on a cycloid. This equidistant curve is in the range of two adjoining root flanks approximately in the form of a circular section 38 the radius of which corresponds approximately to the radius r of the circular section 36 forming the tip of the tooth of the opposite gear and acting as the generating profile; the tooth tips of the inner gear 19 have a reduced addendum with respect to that of the opposite outer gear and the tip outline 40 of each tooth coincides substantially with the crown circle K. Circular sections 39 and 39' are confluent with the tip line 40 and with cycloidal root flank 38 and, as seen in FIG. 6 each has a reduced radius of curvature $r_k$. The diameter of the circle of rolling $ks'$ is computed from the equation $$Do' = Z' \cdot m$$

where Do' denotes the diameter of the crown circle, Z' denotes the number of teeth of the inner gear 19 and the m denotes the module. The radius r of the circular section 38 of the equidistant cycloid corresponds again to one ¼ of the tooth pitch and results from the aforementioned equation. When now the central point of the generating circle 3b of the radius r is moved along a shortened cycloid the contours generated by a plurality of such central points form the root flanks of the teeth 21 of the inner gear, according to the following equation:

$$X_1(\phi) = x(\phi) + r \cdot \cos[\phi_1(\phi)]$$

$$Y_1(\phi) = y(\phi) + r \cdot \sin[\phi_1(\phi)]$$

where X ($\phi$) and Y ($\phi$) are the coordinates of the shortened cycloid and are computed from the following equations:

$$X(\phi) = \tfrac{1}{2} \cdot (Do' - Do) \cdot \cos \phi + (Do/2 + a) \cdot \cos[\phi \cdot (1 - Do'/Do)]$$

$$Y(\phi) = \tfrac{1}{2} \cdot (Do' - Do) \cdot \sin \phi + (Do/2 + a) \cdot \sin[\phi \cdot (1 - Do'/Do)]$$

whereby r is again the radius of the generating circle, $\phi_1(\phi)$ is the pitch angle of the normal to the tangent on the shortened cycloid. This angle is computed from the equation:

$$\phi_1(\phi) = \arctan(-\overset{\circ}{X}/\overset{\circ}{Y})$$

wherein
$$\overset{\circ}{X} = d/d[\overset{\circ}{X}(\phi)]$$

$$\overset{\circ}{Y} = d/d[\overset{\circ}{Y}(\phi)]$$

The radius of smaller circular sections or roundings 39 and 39' forming the transition between the root flanks and the tip of the inner teeth is computed from the radius of curvature of the generated root curve 38. The measure for the crown roundings 39 and 39' corresponds to the smallest radius of curvature of the curve of the root flanks and the coordinates of these crown roundings correspond to the coordinates of the latter. The smallest radius of curvature of the ends of the cycloid sections confluent with the tip contour 40 of each tooth result from the following equation:

$$Rk = (B_1 + A_3 C)^{\frac{3}{2}} / (B_2 + A_4 C) = r$$

Whereby the symbols used in the above equation are the abbreviations of the following expressions:

$$r_3 = Do'/2 - Do/2$$

$$r_4 = 1 - Do'/Do$$

$$A_1 = 2 \cdot (r_4^2 - r_4) \cdot r_3 \cdot (Do/2 + a)$$

$$A_2 = (r_4^3 - r_4) \cdot r_3 \cdot (Do/2 + a)$$

$$A_3 = 2r_3 - r \, 4 \cdot (Do/2 + a)$$

$$A_4 = r_3 \cdot (Do/2 + a) \cdot (r_4^2 + r_4)$$

$$B_1 = r_3^2 + r_4^2 \cdot (Do/2 + a)^2$$

$$B_2 = r_3^2 + r_4^3 \cdot (Do/2 + a)^2$$

$$C = (A_2 \cdot B_1 - 3A_1 \cdot B_2/2)/3A_1 \cdot A_4/2 - A_2 \cdot A_3)$$

The diameter of the root circle of the gear ring 21 of the inner gear 19 results from the equation:

$$Df = Do' + (a + r) \cdot 2$$

Wherein Df is the diameter of the root circle, Do' is the diameter of the circle of rolling of the inner gear and wherein a is again the distance between the central point of the generating circle having the radius r and the circle of the rolling ks' of the inner gear 19. The radius of the crown circle results from the subtraction of the radius of the crown groundings from the radius of the coordinates xm, ym of the center point of the crown rounding 39.

The equation of the coordinates of the central point of the crown roundings are as follows:

$$Xm = x + (rk + r) \cdot \cos \phi$$

$$Ym = y + (rk + r) \cdot \sin \phi$$

wherein x and y are the assigned coordinates of the path of the central point. The diameter of the crown circle Dk' of the toothed ring 21 of the inner gear 19 is accordingly computed from the following equation:

$$Dk' = 2\sqrt{xm^2 + ym^2 - rk}$$

Figure 7:
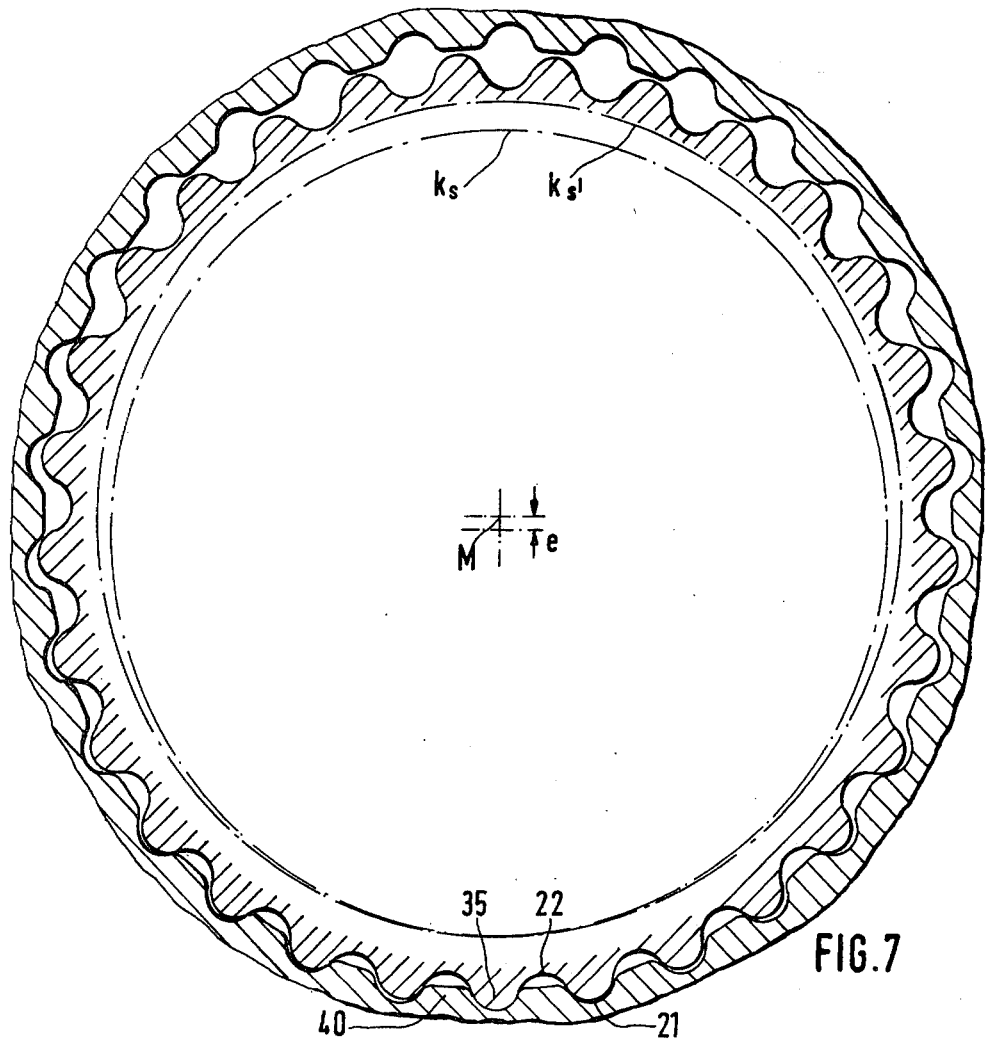
FIG. 7 shows on an enlarged scale a detail view of the wobbling gears of FIG. 4.

The mode of engagement of the toothed ring 22 of the outer gear 20 with the tooth ring 21 of the inner gear is illustrated most clearly in FIG. 7 where it can be also seen how the shape of the tooth tips 40 of the inner gear is shorter relative to that of the teeth 35 of the outer gear and the degree of overlapping of the two toothed rings 21 and 22. Due to the shortened shape of the tips 40 of the inner gear, the teeth 35 of the outer gear 22 can engage and disengage the spaces between the inner teeth 21. During this rolling engagement the toothring 22 of the outer gear perform a wobbling motion in the rouge of the eccentricity e and roll about the central point M of the toothed ring 21 of the inner gear 19. The eccentricity e corresponds to half the difference between the diameters of the circle of rolling ks' of the inner toothed ring 21 and the circle of rolling ks' of the outer toothing 22.

It will be understood that each of the elements described above, or two or more together, may also find a useful application in other types of constructions differing from the types described above.

While the invention has been illustrated and described as embodied in a specific example of the adjustable hinged mount for use with motor vehicle seats, it is not intended to be limited to the details shown, since various modifications and structural changes may be made without departing in any way from the spirit of the present invention. For example, it is possible to make the contour of the inner toothing 21 in the form of confluent and equally shaped convex and concave circular sections similar to the profile of teeth of the outer gear in the preceding example whereas the outer toothing 22 of outer gear 20 has a reduced addendum so that the tip outlines of respective teeth coincide with the crown circle and the tooth flanks have crown roundings confluent with root flanks, the letter having a contour equidistant from a cycloid.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hinged mount for seats having an adjustable backrest, comprising: a fixed mount part secured to the seat proper and a tiltable mount part secured to the backrest; a wobble gear assembly including an outer gear formed on one mount part and an inner gear formed on the other mount part; the number of teeth of respective gears differing at least about one tooth; a rotary axle having an eccentric portion supporting one of said gears and a concentric portion supporting the other gear to roll said outer gear in mesh with said inner gear; the outline of the teeth of one gear forming tangentially confluent convex and concave circular sections having a substantially equal radius of curvature; the outline of the teeth of the other gear being formed of concave sections of a cycloid having a radius of curvature corresponding substantially to that of the circular sections of the one gear, of convex circular sections confluent with said cycloid sections and having a smaller radius of curvature than the latter, and of concave circular tip sections confluent with said convex sections and having a radius of curvature corresponding substantially to the radius of the crown of said one gear.

2. The hinged mount as defined in claim 1 wherein the center of curvature of the convex circular sections forming the tips of respective teeth is spaced apart about a predetermined distance from the circles of rolling of said gears.

3. The hinged mount as defined in claim 1 wherein the outline of the toothing of the outer gear is defined by tangentially confluent concave and convex circular sections having approximately the same diameter whereby the convex circular section forming the tips of respective teeth correspond to a generating circle of a cycloid, said cycloid being equidistant from the cycloid sections in the outline of the root flanks of the inner teeth.

* * * * *